United States Patent [19]
MacLean et al.

[11] Patent Number: 5,356,688
[45] Date of Patent: Oct. 18, 1994

[54] HONEYCOMB STRUCTURE END CLOSURE

[75] Inventors: Robert D. MacLean, Bellevue; Donald J. Mihalevic, Federal Way, both of Wash.

[73] Assignee: The Boeing Company, Seattle, Wash.

[21] Appl. No.: 45,542

[22] Filed: Apr. 8, 1993

[51] Int. Cl.⁵ .................................. B32B 3/12
[52] U.S. Cl. ..................... 428/73; 428/116; 428/119; 156/295
[58] Field of Search ............ 428/73, 116, 119; 156/295, 293

[56] References Cited

U.S. PATENT DOCUMENTS

| | | | |
|---|---|---|---|
| 2,797,447 | 12/1952 | Winer | 20/15 |
| 3,145,000 | 5/1963 | Mackie | 244/123 |
| 3,655,818 | 10/1968 | McKown | 260/837 |
| 4,284,443 | 8/1981 | Hilton | 156/60 |
| 4,335,174 | 6/1982 | Belko | 428/73 |
| 4,411,597 | 10/1983 | Koffel et al. | 428/92 |
| 5,034,256 | 7/1991 | Santiso et al. | 428/73 |
| 5,086,997 | 2/1992 | Glass | 244/123 |

Primary Examiner—Alexander S. Thomas
Attorney, Agent, or Firm—Conrad O. Gardner

[57] ABSTRACT

An end closure for an airfoil, e.g., a flap or aileron of honeycomb core structure, wherein a closure plate having flanges of dovetail configuration is utilized with a sealant in which the dovetail flanges are embedded prior to curing of the sealant.

5 Claims, 1 Drawing Sheet

HONEYCOMB STRUCTURE END CLOSURE

BACKGROUND OF THE INVENTION

This invention relates generally to honeycomb structures, and more particularly to a method and structure for preventing potting compound deterioration in exposed chordwise honeycomb core cells used for flight control surfaces of aircraft. Occurrences of skin delamination and core corrosion caused by water or debris disbonding the interface between the skin and honeycomb case of the structure at the end caps is required to be prevented.

A prior attempt for closure at the end caps of the honeycomb structure used on external aircraft parts was to fill the area of honeycomb with potting compound. Debris thrown up by landing gear wheels or engine, the sonic environment, and the rubbing of aerodynamic seals could cause the potting compound to crack, thereby leading to possible honeycomb core corrosion and/or the bonded structure common to the honeycomb core to disbond/delaminate. In such event, the structure would require service and rework to the same initial configuration.

DESCRIPTION OF THE PRIOR ART

The patent literature includes U.S. Pat. No. 5,034,256 to Santiso III, et al, issued Jul. 23, 1991, which shows a closeout configuration for honeycomb core consisting of a composite end cap adhesively bonded to the edge of the honeycomb panel.

U.S. Pat. No. 4,335,174 to Belko, issued Jun. 15, 1982, also shows an end closure consisting of an elastomeric end cap that is bonded to the edge of a honeycomb panel using first a tape adhesive and then a foam adhesive.

U.S. Pat. No. 2,797,447 to Winer, issued Jul. 2, 1957, shows the flange of the edge piece inserted into a kerf (previously machined into the perimeter of the core) and secured by adhesive.

SUMMARY OF THE INVENTION

In contrast to the aforementioned structure of U.S. Pat. No. 2,797,447, no barrier of sealant for positively retaining the end closure is utilized. U.S. Pat. No. 2,797,447 relies upon an adhesive layer for protecting the core from contamination and moisture, which would appear inadequate in the severe environment external to an aircraft. The edge closure described in the 2,797,447 patent fails to add strength to the edge of the core in contrast to the bed of sealant utilized in the subject invention structure.

In accordance with the present invention, a honeycomb structure end closure is attached prior to sealant curing for providing a double barrier to moisture penetration. The end cap is positively retained utilizing angled flanges which are stepped or continuous.

PREFERRED EMBODIMENT OF THE INVENTION

Figure 1:
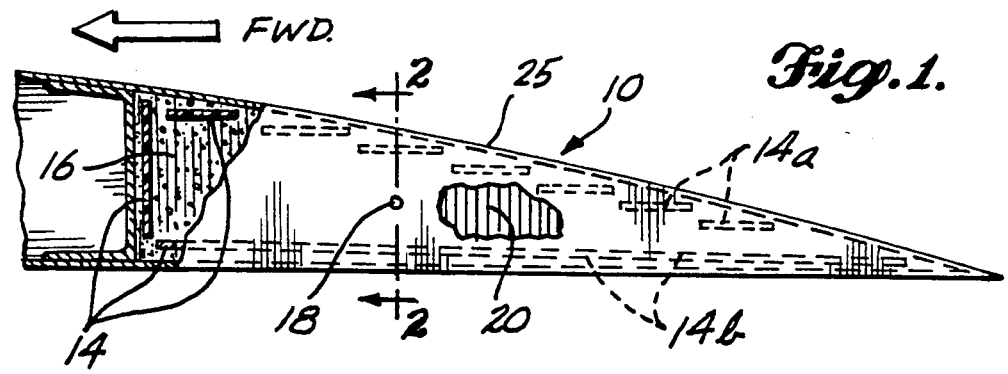
FIG. 1 is an end elevational view with partial section of an exemplary flap or aileron with closure plate installed.
Figure 2:
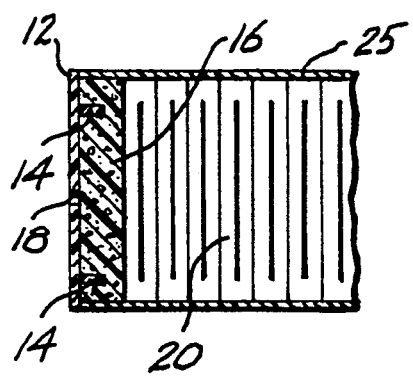
FIG. 2 is a section taken along the lines 2—2 of FIG. 1 showing the closure plate set in sealant and being positively retained by angled flanges; and, FIG. 3 is an exploded isometric view of the flap or aileron structure of FIG. 1.
Figure 3:
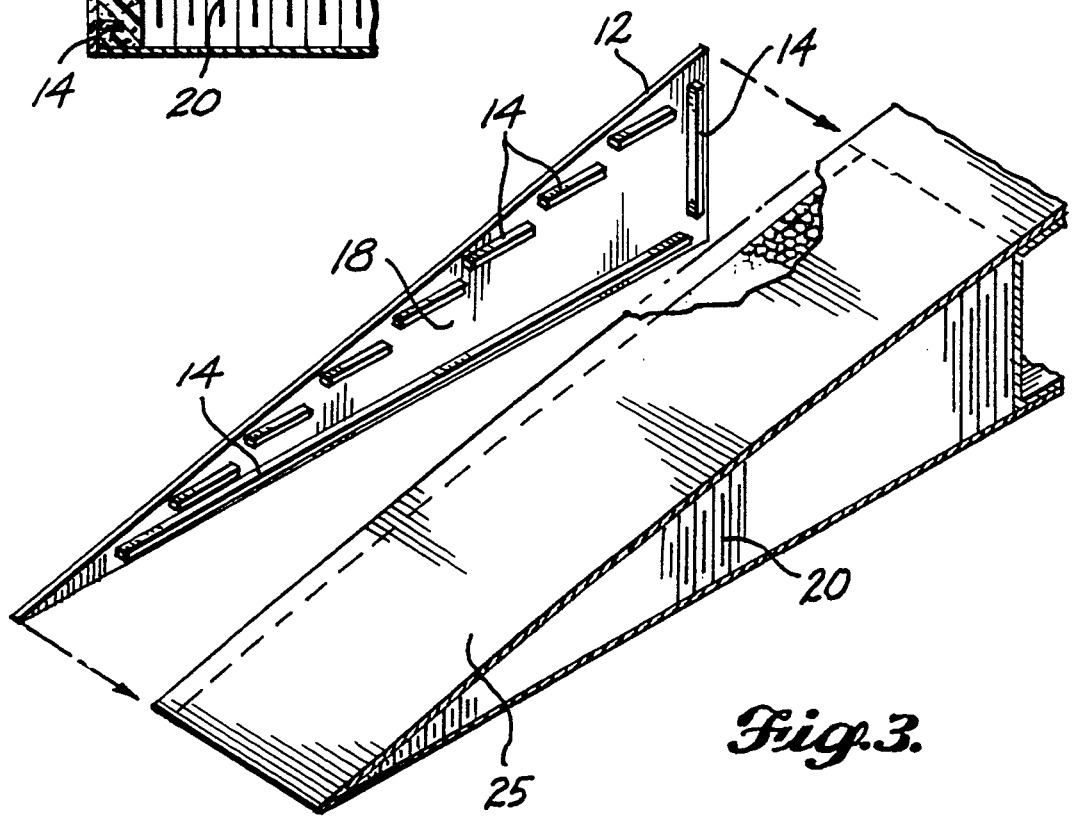

Turning now to FIG. 1, an end flap (or aileron) 10 can be seen to include (as better seen in FIGS. 2 and 3) an end plate 12 having angled flanges 14 (seen in FIGS. 1-3) set in a second barrier of sealant 16 and positively retained by angled flanges 14, subsequent to insertion into the curing of sealant 16. End plate 12 includes a sealant bleed hole 18 (see FIG. 3) to provide passage out of sealant during the method of assembly of end plate 12 in abutting relationship against honeycomb core 20 which is covered by skin 25. As seen in FIG. 1, angled flanges 14 may be of either stepped (14a) or continuous (14b) configuration.

ADVANTAGES OF THE PRESENT HONEYCOMB STRUCTURE END CLOSURE

1. The precut end closure with closure plate embedded in sealant provides a double barrier from moisture penetration.

2. The closure plate with angled flanges provides a good wear surface when rubbed by abrasive aerodynamic seals.

3. The sealant bed behind the closure plate and into which the angled flanges are embedded provides sufficient flexibility to allow the closure plate to absorb impacts without breaking the moisture barrier.

What is claimed is:

1. In combination:
    a honeycomb core structure;
    having a skin covering and an exposed honeycomb core end section;
    a sealant disposed in said exposed honeycomb core end section;
    a closure plate;
    said closure plate having an aperture and angled flanges;
    said angled flanges embedded in said sealant.

2. The combination, according to claim 1, wherein said angled flanges are disposed in a step-like configuration along the length of said closure plate.

3. The combination, according to claim 1, wherein said angled flanges are distributed continuously along the length of said closure plate.

4. A method of securing an end closure to an exposed honeycomb core section comprising the steps of:
    positioning a sealant in the exposed honeycomb core section;
    providing a closure plate having angled flanges and an aperture therein in abutting relationship against said exposed honeycomb core section with the angled flanges inserted in the sealant, and then curing said sealant to permanently retain the angled flanges in the sealant.

5. The method, according to claim 4 wherein the step of providing a closure plate having angled flanges and an aperture therein in abutting relationship against said exposed honeycomb core section includes the step of forcing sealant through said aperture.

* * * * *